INVENTORS
Robert H. Keith and
Clarence L. Mershon

Sept. 6, 1955  R. H. KEITH ET AL  2,717,318

OVERVOLTAGE DETECTION FOR ALTERNATING-CURRENT GENERATORS

Filed Jan. 9, 1953  2 Sheets-Sheet 2

WITNESSES:
John E. Heasley
Wm. B. Sellers.

INVENTORS
Robert H. Keith and
Clarence L. Mershon.
BY
ATTORNEY

United States Patent Office 2,717,318
Patented Sept. 6, 1955

2,717,318

OVERVOLTAGE DETECTION FOR ALTERNATING-CURRENT GENERATORS

Robert H. Keith and Clarence L. Mershon, Lima, Ohio, assignors to Westinghouse Electric Corporation, East Pittsburgh, Pa., a corporation of Pennsylvania Application January 9, 1953, Serial No. 330,510

12 Claims. (Cl. 307—51)

The present invention relates to the detection of overvoltage, or overexcitation, of one generator in a system of alternating-current generators operating in parallel and, more particularly, to means for detecting when one generator in such a system is producing, or tending to produce, overvoltage and for selecting and disconnecting the offending generator.

When two or more alternating-current generators are operated in parallel, the division of real load, that is, kilowatt load, between the generators, is determined by their relative speeds and is independent of the voltage or excitation of the machines. The division of reactive load between the generators, however, is a function of the excitation of the machines, and if one generator becomes overexcited, due to loss of control by its voltage regulator, or for any other reason, so that its voltage rises or tends to rise, the reactive current supplied by that generator increases, and the reactive current supplied by the other generator or generators of the system is reduced. This is undesirable, even though the division of real load is not affected, because of the increased heating of the overexcited generator due to the increased current, and also because the rise in voltage may cause the voltage regulators of the other machines to reduce their excitation, thus aggravating the condition. It is necessary, therefore, in such a system to provide means for controlling the voltage regulators of the generators to maintain the desired division of reactive load, and also to provide for detecting and removing from the system a generator which becomes overexcited because of loss of control by the voltage regulator or for any other reason.

The principal object of the present invention is to provide a reliable and relatively simple means for detecting overvoltage, or overexcitation, of one generator in a system of alternating-current generators operating in parallel and for selecting the particular generator which is producing the overvoltage.

Another object of the invention is to provide overvoltage detecting means for a system of paralleled alternating-current generators in which a signal current is provided proportional to the difference in load currents of the generators and voltages derived from this signal current are applied to overvoltage relays associated with each generator in a manner to cause operation of the relay of the generator producing the overvoltage and to prevent operation of the relays of the other generator or generators.

A further object of the invention is to provide a system of paralleled alternating-current generators having means for equalizing the reactive currents supplied by the generators by providing a signal current proportional to the difference in load currents of the generators and using this signal current to control the voltage regulators of the generators to maintain the desired reactive load division, and in which voltages derived from the signal current are used to modify the voltages applied to overvoltage relays associated with each generator in such a way that the relay of a generator producing, or tending to produce, overvoltage is caused to operate and the relays of the other generator or generators are prevented from operating.

Other objects and advantages of the invention will be apparent from the following detailed description, taken in connection with the accompanying drawings, in which.

Figure 1:
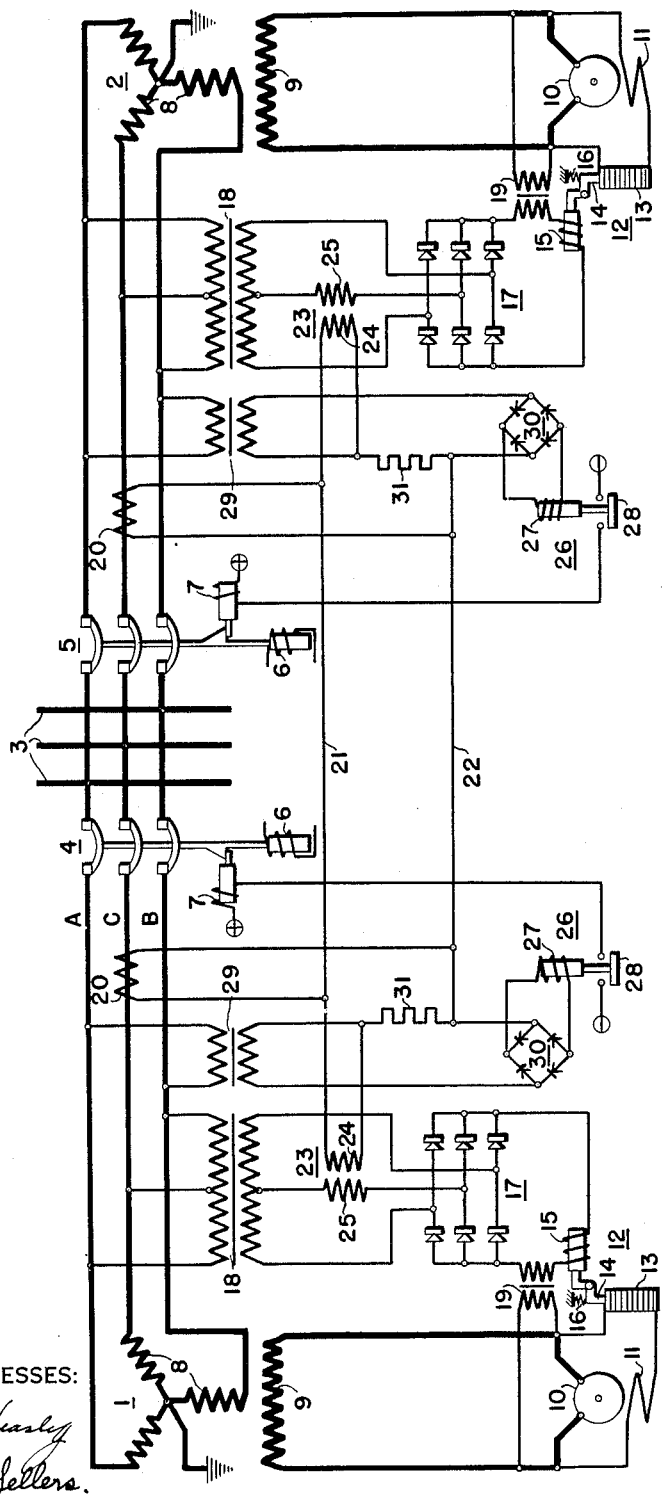
Figure 1 is a schematic wiring diagram showing a preferred embodiment of the invention.

The invention is shown in Fig. 1 applied to a system comprising two three-phase alternating-current generators 1 and 2 connected in parallel to a load bus 3 by means of circuit breakers 4 and 5, respectively. Each of the circuit breakers 4 and 5 has a closing coil 6, which may be controlled manually or automatically in any desired manner, and a trip coil 7 controlled as described hereinafter, and which may also be controlled manually or by any additional automatic means. The particular system shown for the purpose of illustration is of the type frequently used for supplying alternating-current electrical systems on large airplanes, although the usefulness of the invention is obviously not restricted to this particular type of system. It will also be apparent that the invention is applicable to systems having more than two generators in parallel.

The generators 1 and 2 are shown as being identical and each has three-phase armature windings 8 and a field winding 9. The field winding 9 of each generator is excited with direct current by an exciter 10, which is a self-excited direct-current generator having a shunt field winding 11. The output voltage of each generator is controlled by means of a voltage regulator 12 which controls the field current of the exciter 10, and thus the voltage of the exciter and the field current of the generator. The voltage regulator 12 is shown as being of the carbon pile type, having a carbon pile 13 connected in series with the exciter field winding 11. The resistance of the carbon pile 13 is varied by means of a pressure mechanism 14, of any suitable type, controlled by a coil 15 acting in opposition to a spring 16. The coil 15 is energized from the output voltage of the generator through a three-phase rectifier bridge 17 and a transformer 18, so that the coil 15 responds to the average of the three phase voltages of the generator. If desired, a stabilizing transformer 19 may also be provided having its primary winding connected across the exciter 10 and its secondary winding connected in series with the voltage regulator coil 15. It will be evident that any suitable type of excitation system and voltage regulator may be utilized.

As previously explained, the division of real or kilowatt load between the generators 1 and 2 is determined by their relative speeds, that is, by the settings of the governors of their respective prime movers. The division of reactive load, however, is a function of the excitation of the generators and means must, therefore, be provided to cause the voltage regulators 12 to maintain proper division of reactive load. For this purpose, a current transformer 20 is provided for each generator, energized by the generator output current, and the secondaries of the current transformers are connected in a loop circuit by the conductors 21 and 22. A mutual reactor 23 is provided for each voltage regulator, with one winding 24 connected to the loop circuit which joins the current transformers and a second winding 25 connected between the transformer 18 and the rectifier bridge 17, as shown.

It can be shown that when both generators are supplying equal currents, the secondary currents of the current transformers 20 circulate in the loop circuit and no current passes through either of the mutual reactors. If one machine, however, attempts to supply more current than the other, a current proportional to the difference in the load currents of the generators flows through the mutual reactors 23. The phase relations between the voltage across the mutual reactor and the line voltage are such that the resultant voltage applied to the circuit of the regulator coil is not affected by differences in kilowatt load but is affected by voltages due to differences in reactive load. Thus, the voltage regulators 12 are made sensitive to changes in reactive load and insensitive to changes in real load, and if the reactive currents supplied by the generators become different, the regulators will act to reduce the excitation of the machine which is supplying the greater reactive current and to increase the excitation of the other machine, so that the correct division of reactive load is maintained.

If the governors of the prime movers which drive the generators 1 and 2 are properly adjusted, the real load is equally divided between the generators and the in-phase components of the current transformer currents will circulate around the series loop. Thus, the only current which will flow in the mutual reactors will be a current proportional to the difference in the reactive currents of the generators. It can be shown that the current flowing through the mutual reactor of the generator supplying the greater reactive current will lag the line-to-neutral voltage of the phase in which the mutual reactor is connected by 90°, while the current flowing in the mutual reactor of the other machine will lead the corresponding voltage by 90°. These phase relations, therefore, cause the voltage regulators to respond in the desired manner to maintain the proper load division.

It may sometimes occur in a system of paralleled alternating-current generators that one generator will become overexcited, due to loss of control by its voltage regulator, because of failure of some part of the regulator or for some other reason, and the over-excited generator will tend to increase its voltage and will supply more than its share of the reactive load. This is highly undesirable because of the increased heating of the generator caused by the increased current, and also because the rise in voltage may cause the regulators of the other machines in the system to decrease their excitation, so that the condition is aggravated and the remaining machines become under-excited, which may have an adverse effect on system stability under heavy load conditions. It is highly desirable, therefore, to provide means for detecting overvoltage, or overexcitation, of one machine and for selecting the offending machine and disconnecting it from the system.

In accordance with the present invention, an overvoltage relay 26 is associated with each generator. Each of the overvoltage relays has an operating coil 27 connected to respond to the generator voltage and a contact 28 connected to complete an energizing circuit for the trip coil 7 of the corresponding circuit breaker. The loop circuit 21, 22 previously described, which is provided for the purpose of maintaining proper division of the reactive load, is utilized to cause the relays 26 to select the generator which is overexcited and to disconnect that generator from the system without affecting the remaining generator or generators.

In the embodiment of the invention shown in Fig. 1, the relays 26 are shown as responding to a single-phase voltage of each generator, and each relay is energized from a potential transformer 29 which energizes the relay coil 27 through a single-phase rectifier bridge 30. As previously explained, a signal current is obtained from the loop circuit 21, 22 which is proportional to the difference in load currents of the generators. In accordance with the present invention, this signal current is used to modify the voltages applied to the overvoltage relays 26 to obtain the desired operation. For this purpose, a voltage derived from the signal current is introduced into the energizing circuit of each of the relay coils 27 by means of a suitable network to provide the proper phase relation between the voltage derived from the signal current and the generator voltage, so as to cause these voltages to add in the desired manner. In the embodiment of Fig. 1, the network used for this purpose is a simple resistor 31 connected in series between the transformer 29 and the rectifier bridge 30, and also connected in series with the mutual reactor 23 to carry the signal current obtained from the loop circuit 21, 22. In the arrangement shown, the phase relations are such that the signal current is in the proper phase relation to the generator voltage to obtain the desired result, and it can, therefore, be applied to the relay sensing circuit by means of a resistor, since no change in phase position is required.

Figure 2:
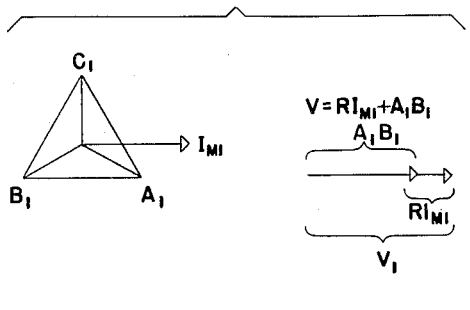
Figs. 2 and 3 are vector diagrams illustrating the operation of the system.
Figure 3:
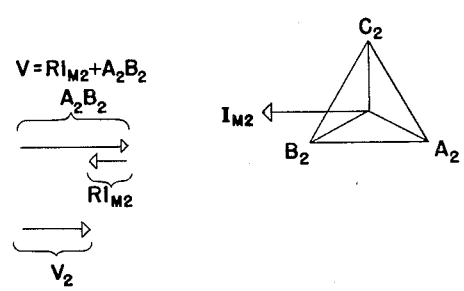

The operation of this system will be more clearly understood by referring to the vector diagrams of Figs. 2 and 3. In these figures, the voltage $A_1B_1$ represents the secondary voltage of the transformer 29 of the generator 1, and the voltage $A_2B_2$ represents the corresponding voltage of the generator 2. The other voltages shown at the left of Fig. 2 and at the right of Fig. 3 represent the other phase voltages of the two generators, corresponding to the phases A, B and C, as designated in Fig. 1. As previously explained, if the reactive loads of the generators are different, the signal current derived from the loop circuit 21, 22 will lag the corresponding line-to-neutral voltage of the machine supplying the excessive reactive load by 90°, as shown by the vector $I_{M1}$ of Fig. 2, while the corresponding current of the other machine will lead the corresponding voltage by 90°, as shown by the vector $I_{M2}$ of Fig. 3.

Assuming that the generator 1 is developing overvoltage, or is overexcited, the phase relations of the current $I_{M1}$ and the generator voltages will be as shown in Fig. 2, while the corresponding currents and voltages of the generator 2 will be as shown in Fig. 3. The voltage drops across the resistors 31 are added vectorially to the voltages $A_1B_1$ and $A_2B_2$, respectively, and since the phase relations are as indicated, the resultant voltages $V_1$ and $V_2$ applied to the relays 26 will be as shown in Figs. 2 and 3. The voltage drop $RI_{M1}$ across the resistor 31 associated with the generator 1 adds directly to the generator voltage, while the corresponding voltage drop $RI_{M2}$ of the resistor associated with the generator 2 subtracts from the generator voltage. Thus the voltage to which the relay 26 of the overexcited generator responds is increased, while the voltage to which the relay of the other generator responds is decreased. The relays 26 preferably have inverse time-voltage characteristics, and it will be evident that the relay 26 of the overexcited generator will operate to energize the trip coil 7 of the corresponding circuit breaker to disconnect the generator from the system, while the relay 26 of the good generator 2 will be prevented from operating, so that that generator remains connected to the system.

It will be seen that a reliable and relatively simple means has been provided for detecting overvoltage or overexcitation of one machine in a system of paralleled alternating-current generators. The invention is shown applied to a system of two generators, but it will be obvious that it is applicable to systems comprising any number of generators operating in parallel. The overvoltage detection system shown and described has the great advantage that it utilizes the means for maintaining reactive load division which is usually provided in systems of this kind, and thus overvoltage detection is provided with a minimum of extra equipment so that the weight and space requirements are kept small and there is little added complication.

It will be evident that the invention is capable of various modifications and other embodiments. Thus, instead of connecting the overvoltage relays to respond to a single-phase voltage of the generators, it is frequently more desirable to utilize a three-phase relay responding to the average of the three phase voltages. The invention is readily applicable to such a relay in the manner shown in Fig. 4. In this figure, the various components of the system are similar to those of Fig. 1 and are identified by the same reference numerals, only one generator being shown for simplicity. An overvoltage relay 35 is provided for each generator having its contact 36 connected to energize the circuit breaker trip coil 7, as before, and having its coil 37 connected to be energized from the three-phase generator voltage through a three-phase rectifier bridge 38 and a transformer 39. In this instance, the signal current obtained from the loop circuit 21, 22 is applied to one winding 40 of a mutual reactor which has a second winding 41 connected in series between the transformer 39 and rectifier bridge 38. The mutual reactor winding 40 is connected to the loop circuit in series with the winding 24 of the mutual reactor 23. It will be evident that the use of the mutual reactor 40—41 applies a voltage in the sensing circuit of the relay coil 37 in the proper phase relation to increase the voltage on the relay of an overexcited generator and to reduce the voltage applied to the corresponding relay of the other generator or generators of the system. Thus, the invention is readily applicable to any type of overvoltage relay sensing, either single-phase or three-phase.

Figure 4:
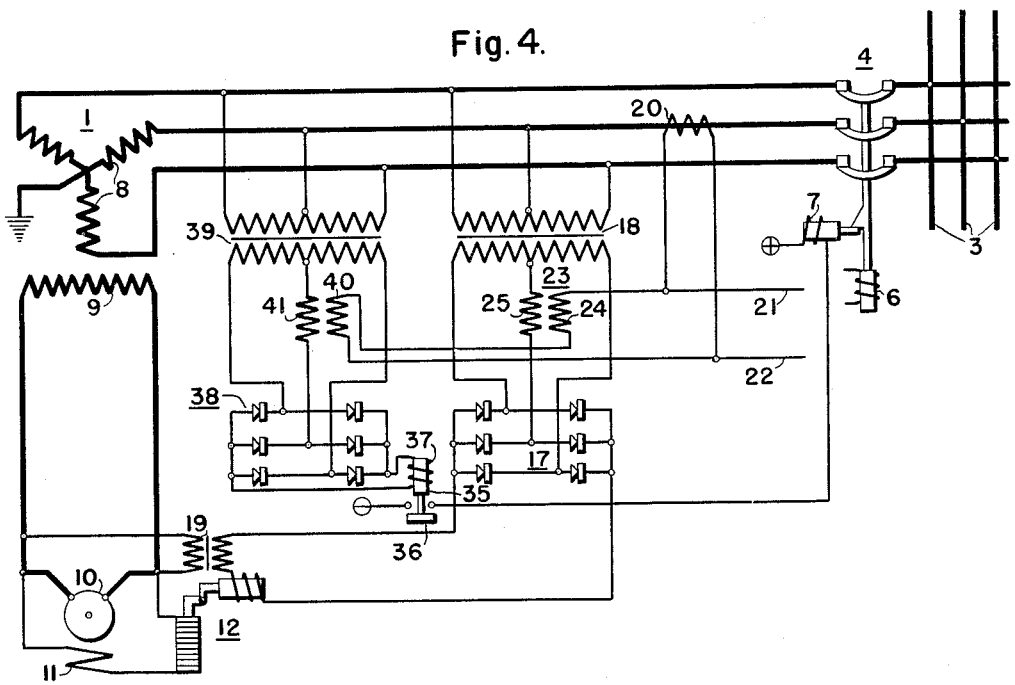
Fig. 4 is a schematic diagram showing a modified embodiment of the invention.

The signal current derived from the loop circuit 21, 22 may be introduced into the relay sensing circuit by using any suitable type of network, such as the resistor of Fig. 1 or the mutual reactor of Fig. 4, or any other type of network which will introduce a voltage in the proper phase relation to cause it to modify the generator voltage in the desired manner. It will be obvious that, if desired, operation of the overvoltage relay can be used to energize a signal or to effect any other desired operation instead of, or in addition to, tripping the circuit breaker.

It will now be evident that an overvoltage detecting means has been provided for alternating-current generators operating in parallel which provides positive and reliable protection by selecting the particular generator which is overexcited, and disconnecting it from the system. This result is obtained in a relatively simple manner by utilizing a signal current proportional to the difference in the generator load currents and applying voltages derived from this signal current to modify the generator voltages to which the overvoltage relays are responsive in such a manner as to cause operation of the relay of the overexcited generator and to prevent operation of the relays of the other generators. It will be understood that the invention is not limited to the specific systems shown and described for the purpose of illustration, and that it is capable of various other modifications and embodiments.

We claim as our invention:

1. A control and protective system for an alternating-current generator adapted to be operated in parallel with other generators, said system comprising a relay connected to respond to the voltage of said generator, means for obtaining a signal current proportional to the difference between the load current of the generator and the load current of another generator operating in parallel therewith, and means for deriving a voltage from said signal current and applying said voltage to the relay to modify the voltage to which the relay responds.

2. A control and protective system for an alternating-current generator adapted to be operated in parallel with other generators, said system comprising a relay connected to respond to the voltage of said generator, means for obtaining a signal current proportional to the difference between the load current of the generator and the load current of another generator operating in parallel therewith, a network connected to be energized by said signal current, and means for applying the voltage of said network to the relay to modify the voltage to which the relay responds.

3. A control and protective system for an alternating-current generator adapted to be operated in parallel with other generators, said system comprising a relay connected to respond to the voltage of said generator, means for obtaining a signal current proportional to the difference between the load current of the generator and the load current of another generator operating in parallel therewith, a network connected to be energized by said signal current, and means for connecting said network to add its voltage to the voltage to which the relay responds.

4. A control and protective system for an alternating-current generator adapted to be operated in parallel with other generators, said system comprising a relay connected to respond to a phase voltage of said generator, means for obtaining a signal current proportional to the difference between the load current of the generator and the load current of another generator operating in parallel therewith, a resistor connected in series with the relay, and means for connecting the resistor to carry said signal current.

5. A control and protective system for an alternating-current generator adapted to be operated in parallel with other generators, said system comprising a relay connected to respond to the polyphase voltage of said generator, means for obtaining a signal current proportional to the difference between the load current of the generator and the load current of another generator operating in parallel therewith, and a mutual reactor having one winding connected to be energized by said signal current and another winding connected in series with one phase of the voltage to which the relay responds.

6. In a system comprising a plurality of alternating-current generators connected together for operation in parallel, a relay associated with each generator and connected to respond to the generator voltage, each generator having means for obtaining a signal current proportional to the difference between the load currents of the generators, and means for deriving a voltage from the signal current of each generator and applying said voltage to the corresponding relay to modify the voltage to which the relay responds.

7. In a system comprising a plurality of alternating-current generators connected together for operation in parallel, a relay associated with each generator and connected to respond to the generator voltage, each generator having means for obtaining a signal current proportional to the difference between the load currents of the generators, a network connected to be energized by the signal current of each generator, and means for applying the voltage of each of said networks to the corresponding relay to modify the voltage to which the relay responds.

8. In a system comprising a plurality of alternating-current generators connected together for operation in parallel, a relay associated with each generator and connected to respond to the generator voltage, each generator having means for obtaining a signal current proportional to the difference between the load currents of the generators, a network connected to be energized by the signal current of each generator, and means for connecting each of said networks to add its voltage to the voltage to which the corresponding relay responds.

9. In a system comprising a plurality of alternating-current generators connected together for operation in parallel, a relay associated with each generator and connected to respond to the generator voltage, a current transformer for each generator energized by the generator load current, a loop circuit interconnecting said current transformers, means associated with each generator for deriving from said loop circuit a signal current proportional to the difference in the load currents of the generators, and means for deriving a voltage from the signal current of each generator and applying said voltage to the corresponding relay to modify the generator voltage to which the relay responds.

10. In a system comprising a plurality of alternating-current generators connected together for operation in parallel, a relay associated with each generator and connected to respond to the generator voltage, a current transformer for each generator energized by the generator load current, a loop circuit interconnecting said current transformers, a network for each generator connected to said loop circuit to be energized by a current proportional to the difference in the generator load currents, and means for applying the voltage of each of said networks to the corresponding relay to modify the generator voltage to which the relay responds.

11. In a system comprising a plurality of alternating-current generators connected together for operation in parallel, a relay associated with each generator and connected to respond to a phase voltage of the generator, a current transformer for each generator energized by the generator load current, a loop circuit interconnecting said current transformers, a resistor connected in series with the relay of each generator, and means connecting each of said resistors to the loop circuit to be energized by a current proportional to the difference in the load currents of the generators.

12. In a system comprising a plurality of alternating-current generators connected together for operation in parallel, a relay associated with each generator and connected to respond to the polyphase voltage of the generator, a current transformer for each generator energized by the generator load current, a loop circuit interconnecting said current transformers, and a mutual reactor for each generator having one winding connected in series with one phase of the voltage to which the corresponding relay responds and another winding connected to the loop circuit to be energized by a current proportional to the difference in the load currents of the generators.

References Cited in the file of this patent

UNITED STATES PATENTS 2,433,621     Neild _____ Dec. 30, 1947